United States Patent
Niikura

(10) Patent No.: US 7,849,231 B2
(45) Date of Patent: Dec. 7, 2010

(54) METHOD OF CONTROLLING INFORMATION PROCESSING APPARATUS, INFORMATION PROCESSING APPARATUS, AND CONTROL PROGRAM THEREFOR

(75) Inventor: Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 11/177,384

(22) Filed: Jul. 11, 2005

(65) Prior Publication Data

US 2006/0026317 A1  Feb. 2, 2006

(30) Foreign Application Priority Data

Jul. 28, 2004  (JP)  ............... 2004-219554

(51) Int. Cl.
G06F 3/00  (2006.01)
G06F 12/00  (2006.01)
(52) U.S. Cl. ............... 710/8; 709/238; 711/2
(58) Field of Classification Search ............ 710/8
See application file for complete search history.

(56) References Cited

U.S. PATENT DOCUMENTS

| 5,699,494 | A  | * | 12/1997 | Colbert et al. ............ 358/1.15 |
| 6,094,699 | A  | * | 7/2000  | Surugucchi et al. ......... 710/314 |
| 6,134,641 | A  | * | 10/2000 | Anand .................... 711/202 |
| 6,711,162 | B1 | * | 3/2004  | Ortega et al. ............ 370/389 |
| 6,963,946 | B1 | * | 11/2005 | Dwork et al. ............. 710/310 |
| 7,139,817 | B1 | * | 11/2006 | English et al. ........... 709/220 |
| 7,253,915 | B2 | * | 8/2007  | Kemp et al. .............. 358/1.15 |
| 7,443,523 | B2 | * | 10/2008 | Leone et al. ............. 358/1.15 |
| 2002/0059489 | A1 | * | 5/2002 | Davis et al. ................ 710/72 |
| 2002/0140971 | A1 | * | 10/2002 | Machida ................... 358/1.15 |
| 2003/0154258 | A1 | * | 8/2003 | Kakimoto et al. ........... 709/208 |
| 2003/0164852 | A1 | * | 9/2003 | Simpson et al. ............ 345/748 |
| 2004/0205260 | A1 | * | 10/2004 | Oki et al. ................ 710/8 |
| 2005/0198650 | A1 | * | 9/2005 | Ford et al. ............... 719/321 |
| 2005/0251561 | A1 | * | 11/2005 | Hanes ..................... 709/217 |
| 2007/0223473 | A1 | * | 9/2007 | Sakai ..................... 370/389 |

FOREIGN PATENT DOCUMENTS

| JP | 8-255118 | 10/1996 |
| JP | 09-305508 | 11/1997 |
| JP | 2004-064477 | 2/2004 |

* cited by examiner

*Primary Examiner*—Henry W Tsai
*Assistant Examiner*—Michael Sun
(74) *Attorney, Agent, or Firm*—Fitzpatrick, Cella, Harper & Scinto

(57) ABSTRACT

A local interface driver generates a network communication channel through which resources of a peripheral device connected via a local interface can be seen, from application software for accessing resources of a peripheral device connected via a network interface by use of a predetermined network communication system, as network resources accessible using the same predetermined network communication system. Depending on which of the peripheral devices connected to the individual interfaces is used to communicate, either the local interface driver or a network interface driver is selected. A unified user interface can be used for making user's operations or setup operations to peripheral devices without being limited to interfaces via which a host device user gains access to the peripheral devices.

5 Claims, 7 Drawing Sheets

METHOD OF CONTROLLING INFORMATION PROCESSING APPARATUS, INFORMATION PROCESSING APPARATUS, AND CONTROL PROGRAM THEREFOR

BACKGROUND OF THE INVENTION

1. Field of the Invention

The present invention relates to a method of controlling an information processing apparatus that is connectable with peripheral devices via a local interface or a network interface, and also relates to the information processing apparatus and a control program therefor.

2. Related Background Art

In order to connect peripheral devices, such as a facsimile machine, MFP (multifunction peripheral), or printer, with a host device, such as a PC (personal computer), there are known configurations using a local interface of USB or IEEE1284, as well as using a network interface to connect peripheral devices located on a LAN with the host device.

Network settings and handling (e.g., allocation of IP address) of these devices are made based on user's manual operations and also made automatically over a considerably wide range. For example, there are known devices which have a plurality of network interfaces and switch controls by determining which interface is connected to a network (e.g., Japanese Patent Application Laid-Open No. H08-255118).

As described above, while either a local interface or a network interface can now be used to connect a host device with peripheral devices, an exclusive application for gaining a predetermined access to each of the peripheral devices (e.g., setup of, or data input and output to/from peripheral devices) should be prepared depending on the type of interface (local interface or network interface) connecting between the host device and each of the peripheral devices.

For example, for a peripheral device connected via a network interface, it is known to use existing general software, such as a WEB browser, as a network application for gaining access to this peripheral device in order to set up the peripheral device or input and output data thereto/therefrom. This general software, however, cannot be used for peripheral devices connected via a local interface, and therefore another application dedicated thereto needs to be prepared.

Accordingly, it is necessary for users to switch applications for use while being aware of interfaces via which each of peripheral devices is connected as well as of connection methods for those interfaces.

Considering the above problem, it is, of course, preferable to be able to access peripheral devices by using a unified user interface irrespective of types of interfaces via which each peripheral device is connected, and the use of this unified user interface probably leads to reduction in software development costs, and also simplifies and facilitates user's operations.

SUMMARY OF THE INVENTION

The present invention is achieved in consideration of the above problem, and an object thereof is to eliminate the need of providing a host device with software for accessing peripheral devices separately for each interface via which the respective peripheral devices are connected, and to make it possible to use a unified user interface for data input and output to/from and setup operations for the peripheral devices without being limited to interfaces via which each of the peripheral devices is connected.

In the present invention, a local interface driver is used to generate a network communication channel such that resources of a peripheral device connected to the local interface can be seen, from application software for accessing resources of a peripheral device connected via the network interface by use of a predetermined network communication system, as network communication resources accessible using the same predetermined network communication system, and by selecting either one of the local interface driver and a network interface driver for driving the network interface depending on which of the peripheral device connected via the local interface or the peripheral device connected via the network interface is used to communicate, communication is made with the intended peripheral device.

In this configuration, operations, setup, and data input/output for the peripheral device connected via the local interface, which have been supported by dedicated tools, can be made by a general network application (e.g., WEB browser) that is also common to the peripheral device connected via the network interface, thereby reducing software development costs. Furthermore, the unified user interface used for data input and output to/from peripheral devices and setup operations therefor can be provided without being limited to interfaces via which the peripheral devices are connected.

DETAILED DESCRIPTION OF THE PREFERRED EMBODIMENTS

As an embodiment of the present invention, a PC (also referred to simply as a computer, hereinbelow) connectable with a peripheral device via a local interface or a network interface is illustrated, and also communication apparatus such as a facsimile machine or MFP is illustrated as a peripheral device.

In order to make it possible to use one user interface when making user operations or setup operations from the PC side to the communication apparatuses without being limited to interfaces connected to each of the communication apparatuses, the following descriptions will be provided to enable the use of the same application (e.g., WEB browser) as that generally used for resources on a network when access is made from the PC to the communication apparatuses via a local interface.

First Embodiment

Figure 1:
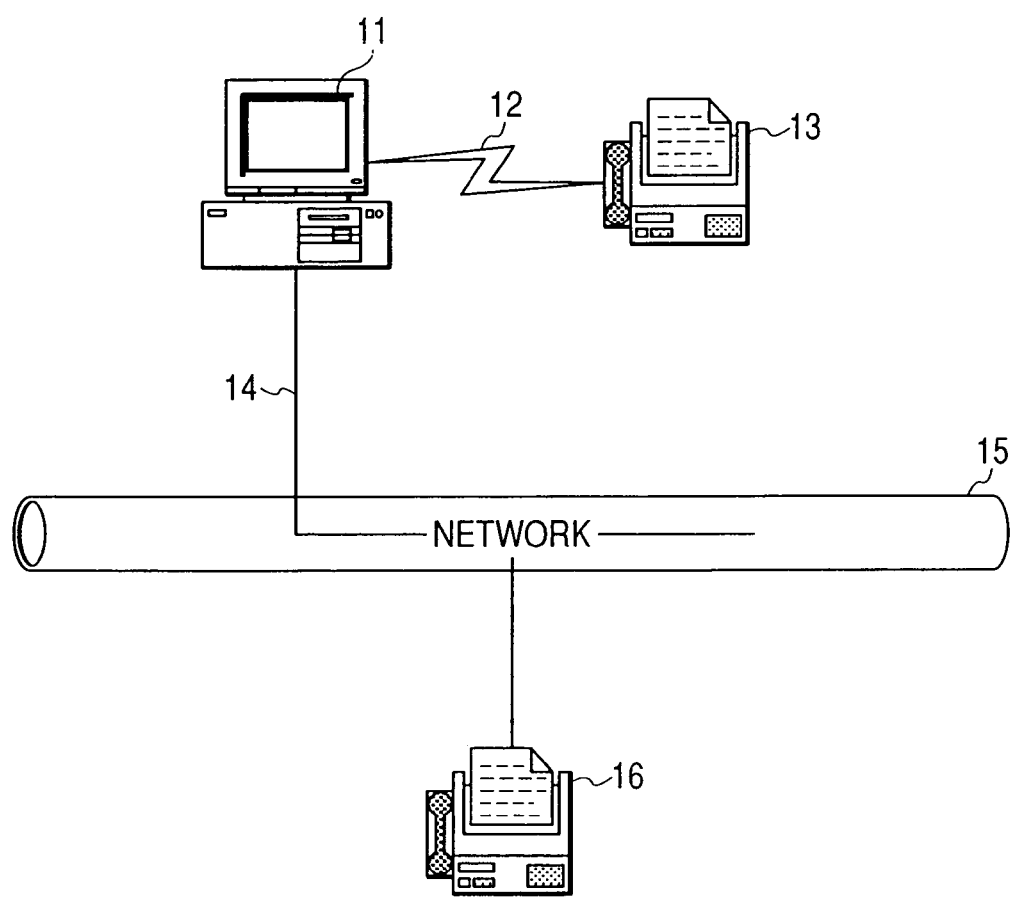
FIG. 1 is an explanatory diagram showing use environment of an information processing apparatus to which the present invention is applied.

FIG. 1 shows a network environment where the present invention can be implemented. In FIG. 1, reference numeral 11 denotes a computer (PC) which is connected to a communication apparatus (1) 13 via a local interface 12. This local interface 12 may be USB, IEEE1284, IEEE1394, and the like.

The computer 11 is also connected to a network 15 via a network interface 14. The network 15 can have any configuration, and in this example, it is an IP network constructed on CSMA/CD (Ethernet: trademark) which is probably the most widely used. A communication apparatus (2) 16 is connected to this network 15.

The communication apparatuses 13 and 16 shown herein have the configuration of a facsimile machine, MFP (multi-function peripheral), and the like.

For example, when the communication apparatuses 13 and 16 are facsimile machines, these devices have image input/output means and are capable of facsimile communication using a telephone line (not shown) or via a communication channel such as the network 15. Furthermore, these communication apparatuses 13 and 16 can perform facsimile communication in response to a request from the computer 11, and this computer 11 can access the information (communication data, management information, setup information, etc.) of the communication apparatuses 13 to 16 via the local interface 12 (or via the network 15).

Figure 2:
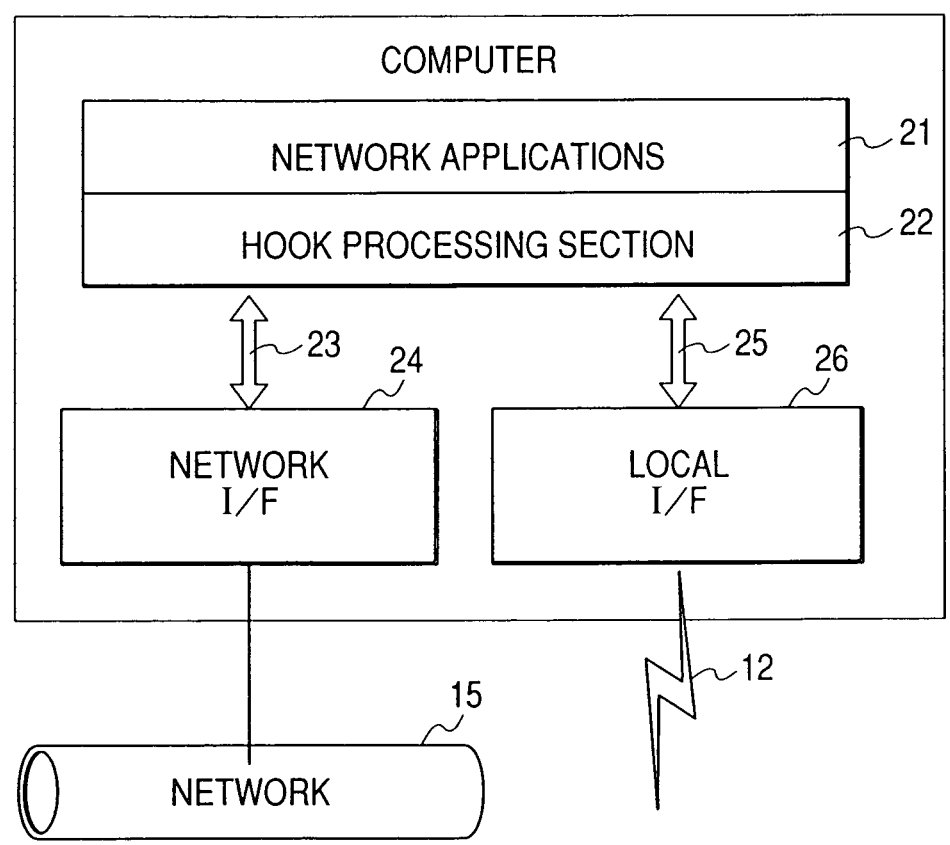
FIG. 2 is an explanatory diagram showing a typical configuration of a network application wrapper implemented on a computer of FIG. 1.

FIG. 2 shows the typical configuration of a relevant part of this embodiment, in a control system of the computer 11. In FIG. 2, illustrations of components unrelated to this embodiment are omitted. For example, a CPU, memory, HDD, and the like, which are essentially provided in the computer 11, are not shown in FIG. 2.

In FIG. 2, reference numeral 21 denotes network application software for accessing resources of the communication apparatuses 13 and 16. In this embodiment, a common network application (e.g., WEB browser) is used to gain access not only to the communication apparatus 16 connected via the network 15 but also to the communication apparatus 13 connected via the local interface 12.

Reference numeral 22 denotes a hook processing section that mediates between the network application software 21 and a network interface driver 24, and between the network application software 21 and a local interface driver 26.

This hook processing section 22 is operable for appropriate data format and protocol conversion depending on whether access is made via the network 15 to the communication apparatus 16 or made via the local interface 12 to the communication apparatus 13.

Reference numeral 23 denotes an interface between the hook processing section 22 and the network interface driver 24. This interface 23 is a general TCP(UDP)/IP network layer and is configured to make TCP(UDP)/IP communication between the network application software 21 and the network interface driver 24 by way of the hook processing section 22.

Reference numeral 24 denotes a network interface driver that sends data received from the hook processing section 22 via the interface 23 to the network 15 and also sends data received from the network 15 to the hook processing section 22 via the interface 23. In general, this type of network interface driver 24 is configured as a network driver to convert CSMA/CD communication of the network 15 to TCP(UDP)/IP communication of the interface 23 and vice versa.

Reference numeral 25 denotes an interface between the hook processing section 22 and the local interface driver 26. This interface 25 is configured to make TCP(UDP)/IP communication between the network application software 21 and the local interface driver 26 by way of the hook processing section 22.

Reference numeral 26 is a local interface driver that sends data received from the hook processing section 22 via the interface 25 to the local interface 12 and also sends data received from the local interface 12 to the hook processing section 22 via the interface 25.

This interface driver 26 is configured to show the local interface 12 such as USB or the resources of the communication apparatus 13 connected over the local interface 12 as network resources (a communication target which has an IP address and is accessible via a TCP or UDP port having a specific number). This allows the network application software 21 to access a specific resource (communication data, management information, setup information, etc.) of the communication apparatus 13 connected over the local interface 12, by using an appropriately generated specific IP address and via a specific port of the IP address (No. 80: HTTP port).

The configuration shown in FIG. 2 can be considered as the so-called a network application wrapper since, as a whole, the communication operation (communication state) of the network application software 21 is hooked so as to execute communication using the local interface as network communication.

Figure 3:
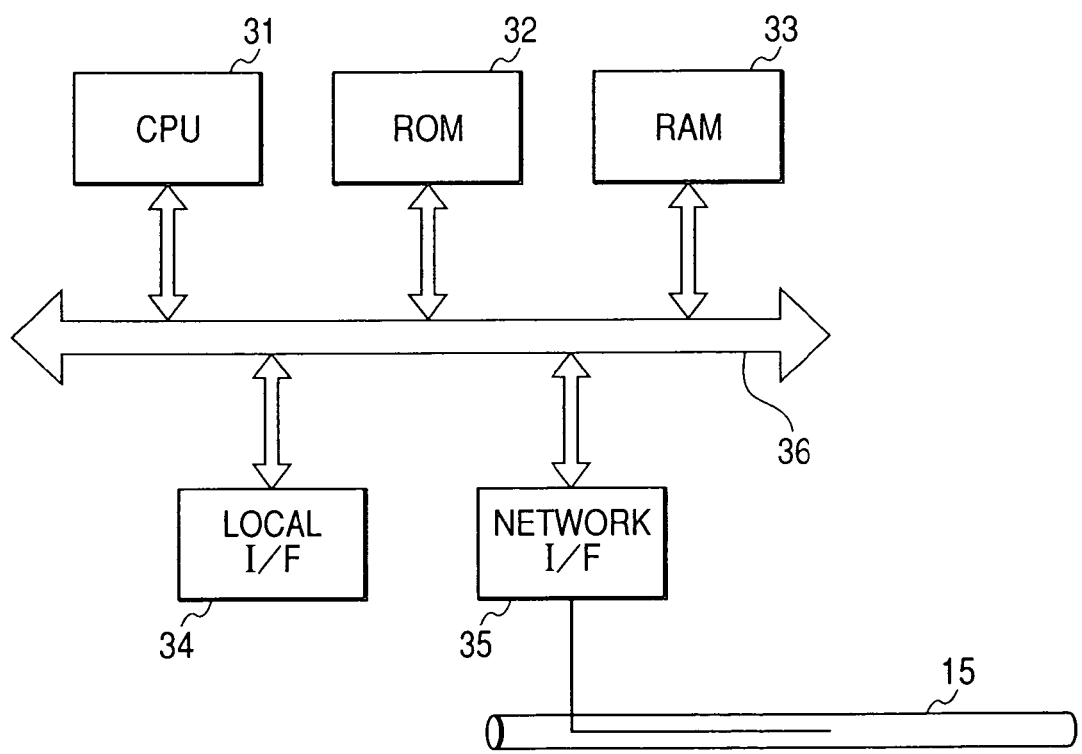
FIG. 3 is a block diagram showing a hardware configuration of a control system in the computer of FIG. 1.

FIG. 3 shows the configuration of the control system of the computer 11 in FIG. 1. In FIG. 3, reference numeral 31 denotes a CPU that controls a local interface 34 and a network interface 35 according to a control program stored in a ROM 32.

The foregoing network interface driver 24 and local interface driver 26 are actually configured as network driver software for driving the network interface 35 and the local interface 34 and are executed by the CPU 31. The foregoing hook processing section 22 is also configured as software executed by the CPU 31.

In the ROM 32, programs which will be described later (FIGS. 4 to 8) and various control constants used for device control are stored.

In a RAM 33, a program work area and a data area for storing data received from the local interface 34 and the network interface 35 are formed.

The local interface 34 is configured of USB, or IEEE1284 or IEEE1394 interface card, and the network interface 35 for communicating with the network 15 is configured of a network interface card according to a communication system such as CSMA/CD.

While the local interface 34 of FIG. 3 (reference numeral 12 of FIG. 1) is configured of USB and the like, when this type of interface is used for connection particularly with a facsimile machine or printer, a protocol such as SCSI or IEEE1284, which is different from a network protocol, is used in usual cases.

In this embodiment, however, by virtue of the configuration of the local interface driver 26 of FIG. 2, the network application software running on the computer 11 can achieve communication using the same network protocol (TCP/IP, UDP/IP, etc.) as that used for the network 15, when making communication with the communication apparatus 13.

This enables the use of the same application (e.g., WEB browser) as generally used for resources on a network when the computer 11 gains access to the communication apparatus 13 via the local interface.

For generation of an IP network communication channel on the local interface 34 (of, e.g., USB), it is conceivable to use a PPP (Point to Point Protocol: RFC1661, RFC2153, STD51, etc.) which can generate network connection without depending on the hardware configuration of an interface.

While a PPP installed system has been often used on a serial port in the early days, PPPoE (PPP Over Ethernet (trademark): RFC2516) so installed as to tunnel PPP on CSMA/CD is now widely used for network connection between PC and ADSL modem.

PPP does not rely upon the hardware configuration of an interface. Therefore, when the local interface 34 is USB, it is possible to generate a point-to-point network connection on the USB local interface 34 by using PPP (as in the case of PPPoE). A PPP layer used for the computer 11 and the communication apparatus 13 can be incorporated into part of an OS of each of the computer 11 and the communication apparatus 13, in the form of software such as the interface driver 26.

Generation of a network communication channel including the generation of an IP address corresponding to the local interface of the local interface driver 26 may be done by manual control according to user's setup operations, or alternatively, may be executed when the local interface is connected to a peripheral device (the foregoing communication apparatus 13) by determining whether the local interface is connected to the peripheral device. For example, when the local interface is USB, a device can be freely detachable in a dynamic manner, and thus the CPU 31 can recognize which device is connected to the local interface, according to information such as a device ID of the USB. Therefore, when a peripheral device which meets communication specifications of this embodiment is connected, generation processing of the above network communication channel can automatically be executed. Furthermore, when the local interface is IEEE1284, connection/disconnection of a device is recognizable in accordance with a state of a predetermined interface signal line, and also it is possible to investigate whether a peripheral device which meets the communication specifications of this embodiment is connected or not by making an inquiry via an appropriate interface.

In a control example described below, it is assumed for simplicity's sake that peripheral devices (communication apparatuses 13 and 16) are connected to the local interface and to the network interface. In the above case of determining whether to generate a network communication channel depending on connection/disconnection of the peripheral device (communication apparatus 13) to the local interface, however, a determination is first made as to whether to make a network communication channel on the local interface effective or ineffective, and subsequently the effective/ineffective state is maintained by a flag or the like until a change occurs in the connection state of the local interface, so that accordingly it is possible to control whether to communicate using the network communication channel on the local interface (e.g., allocation processing of local/network interface such as in step S42 described later).

Figure 4:
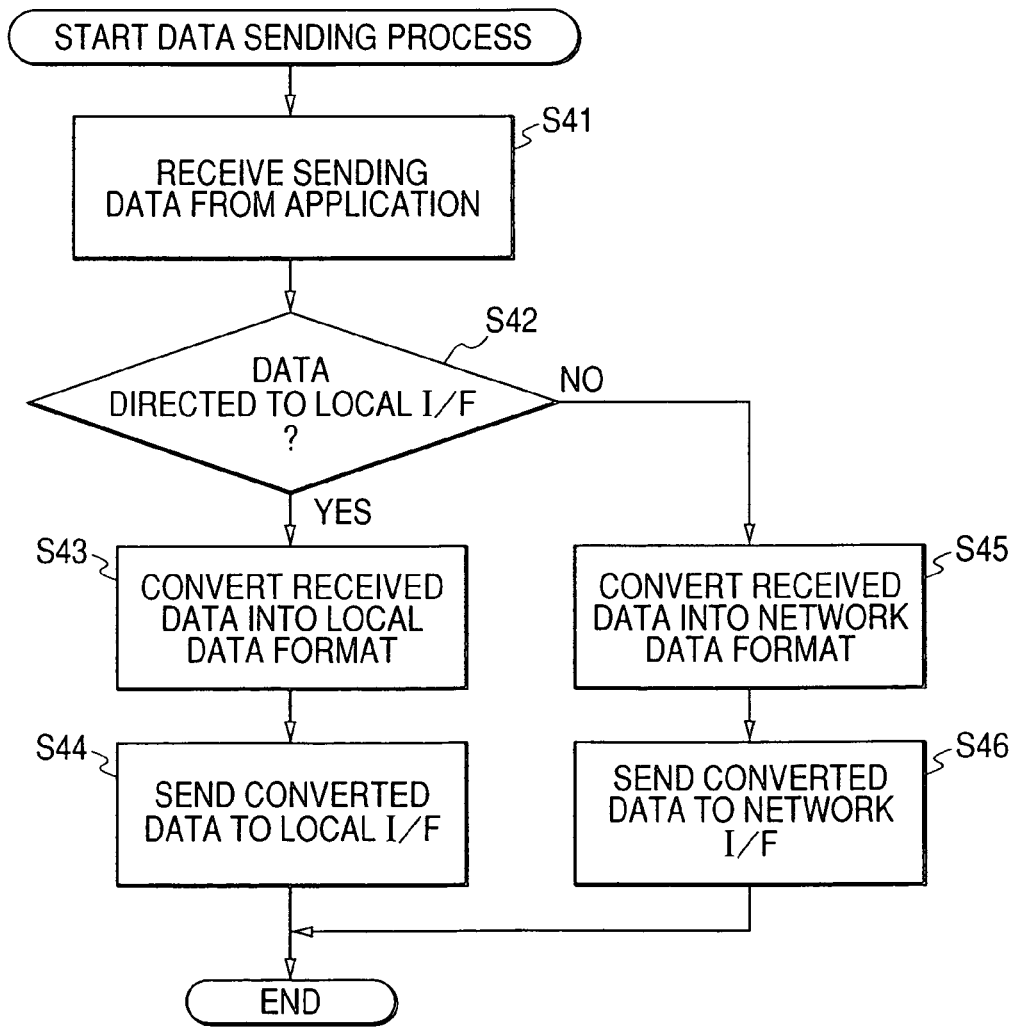
FIG. 4 is a flowchart showing a communication processing procedure of the network application wrapper according to the present invention.
Figure 5:
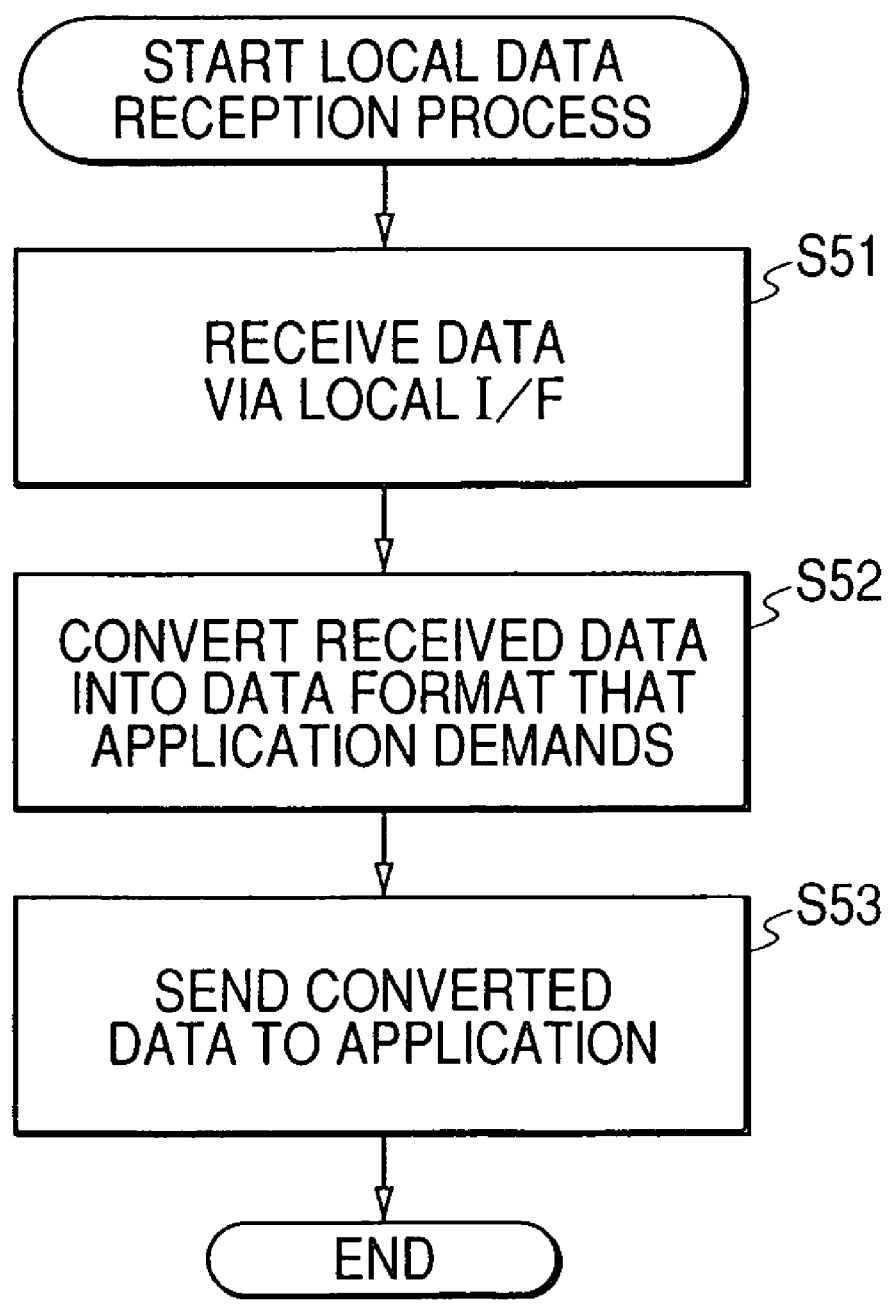
FIG. 5 is a flowchart also showing the communication processing procedure of the network application wrapper according to the present invention.
Figure 6:
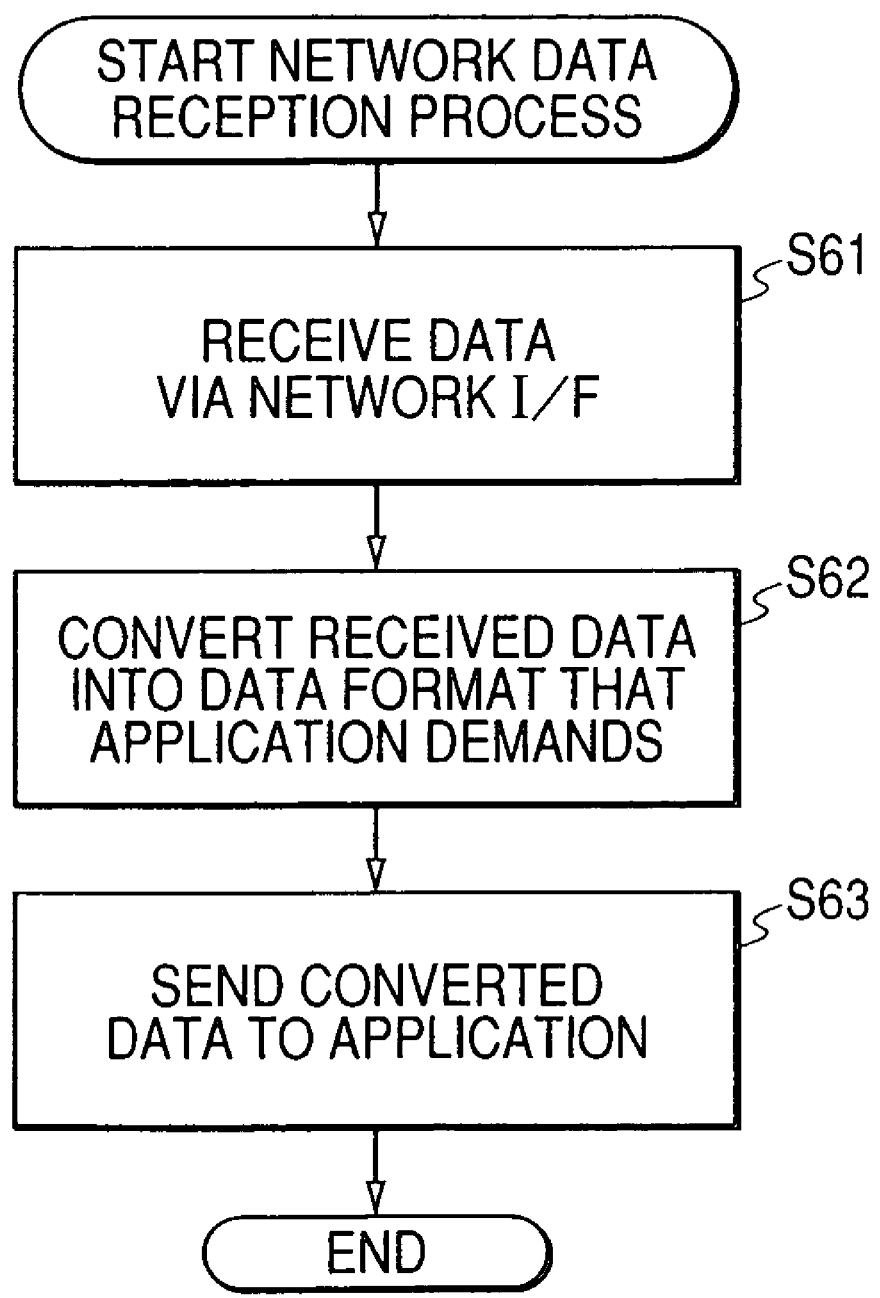
FIG. 6 is a flowchart also showing the communication processing procedure of the network application wrapper according to the present invention.

Next, a description will be given of communication control in the foregoing configuration. FIGS. 4 to 6 show flows of a communication control program executed by the computer 11 of FIG. 1. The processing procedures in the drawings are stored in the ROM 32 (or other storage media) as a control program of the CPU 31 in FIG. 3.

FIG. 4 shows processing steps executed when data transmission is requested from an application (network application software 21 of FIG. 2) to the network application wrapper of FIG. 2.

In FIG. 4, when the network application wrapper receives sending data from the application in step S41, a determination is made in step S42 as to whether the received sending data is directed to the local interface (reference numeral 34 of FIG. 3). When the sending data received from the application is directed to the local interface in this step S41, the procedure proceeds to step S43, and when the received sending data is not directed to the local interface, the procedure proceeds to step S45.

Whether the sending data received from the application is directed to the local interface or not can be easily determined by examining whether the destination address of the sending data (IP packet) is the IP address generated by the local interface driver 26 for the local interface.

In step S43, the sending data received in step S41 is converted to a data format that is transmittable from the local interface. That is, when the local interface is USB, the sending data received in step S41 can be sent by use of USB, and the sending data is converted to a predetermined data format that is interpretable by a communication apparatus (13) connected to the local interface.

In communication over this local interface, IP packets can be delivered to a communication apparatus without losing information peculiar to IP packets, such as an IP sequence number or transmission/reception addresses if IP packets can be sent out over the local interface. However, the purpose of the network application wrapper in this embodiment is to ensure the operations of the network application for accessing the communication apparatus, and therefore it is not necessarily necessary to send IP packets to a communication apparatus without losing information peculiar to IP packets, such as IP sequence number or transmission/reception addresses. Whether to have IP communication over the local interface or to have communication using an original format may be determined according to an appropriately prepared communication protocol with a communication apparatus connected to the local interface.

In step S44, the sending data directed to the local interface which is converted in step S43 is delivered to the local interface driver 26.

On the other hand, in step S45, the sending data received in step S41 is converted to a data format for the network interface. In step S46, the sending data directed to the local interface which is converted in step S45 is delivered to the network interface driver 24. In this case, IP data is delivered as it is to the network interface (reference numeral 35 of FIG. 3) when there is no need of any particular conversion processing.

FIG. 5 shows a processing procedure executed when data is received by the local interface driver 26. In step S51 of FIG. 5, the local interface driver 26 receives data, and in step S52 converts the data received in step S51 to a data format that the network application software 21 demands. In the case where the information received from the communication apparatus (13) via the local interface lacks information peculiar to IP packets, such as IP sequence number or transmission/reception addresses, in accordance with the communication protocol with the communication apparatus (13) connected to the local interface, the local interface driver 26 appropriately generates the missing information to provide a style of (TCP/UDP) IP packets receivable by the network application software 21.

In step S53, the data converted in step S52 is delivered to the network application software 21.

FIG. 6 shows a processing procedure executed when the network interface driver 24 receives data from the network 15. In step S61 of FIG. 6, the network interface driver 24 receives data, and subsequently in step S62, converts the data received in step S61 to a data format that the network application software 21 demands. The processing in step S62 is conversion, for example, from a CSMA/CD data format to a TCP/UDP-IP data format.

In step S63, the data converted in step S62 is delivered to the network application software 21.

In this manner, by providing the network application wrapper as shown in FIG. 2, operations, setup, data input/output for peripheral devices connected to a local interface which have been supported by dedicated tools can be done using a general network application (e.g., WEB browser) which is also common to peripheral devices connected to a network, which leads to reduction in software development costs. Furthermore, a unified user interface for data input/output and setup operations to peripheral devices can be provided without being limited to interfaces connected to the peripheral devices.

As described previously, the network communication emulated by the network application wrapper may be established so that the communication operations of a network application (e.g., WEB browser) can be ensured by showing, to the network application, communication resources of peripheral devices connected to the local interface as network communication resources. Specifications of (IP) network communication emulated by the network application wrapper may be appropriately determined according to a communication protocol with peripheral devices (the foregoing communication apparatuses) connected to the local interface, and the details thereof may be optionally designed by persons skilled in the art. For example, when WEB browser is used as the network application, it is necessary to provide a WEB server function for responding to an HTTP connection request of the WEB browser, and the local interface driver (26) is conceivably configurable to provide this WEB server function.

Figure 7:
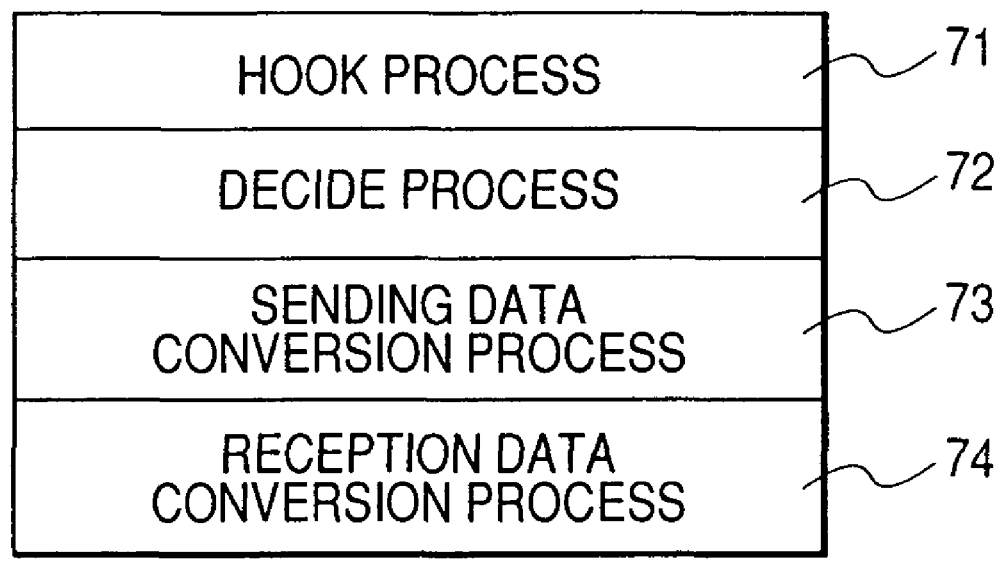
FIG. 7 is an explanatory diagram showing an example of a stored state of software for implementing the present invention.

FIG. 7 shows an example of a stored state of network application wrapper processes of the computer 11 as a memory map. The network application wrapper can be stored in any type of storage medium, but is conceivably stored in the ROM 32 in advance or stored in an external storage medium such as an HDD as a system software of OS so that the computer 11 loads it upon starting. In most cases, this type of software is copied in the RAM 33 and then executed (executed on the ROM 32 when stored therein).

Reference numeral 71 of FIG. 7 denotes an area in which is stored a process of hooking data sent/received between the network application driver 24 and the local device driver, reference numeral 72 denotes an area in which stored a process of determining which of the network interface driver 24 and the local interface driver 26 is used in accordance with details of a numeral 73 denotes an area in which is stored a process of converting the request from the network application 21 to a data format corresponding to a connection destination either of the network interface driver 24 or the local interface driver 26, and reference numeral 74 denotes an area in which is stored a process of converting a request from the network interface driver 24 or the local interface driver 26 to a data format that the network application 21 demands.

The present invention is applicable to an information processing apparatus operable as a computer having a network interface and local interface for connection with peripheral devices or operable in the same manner as a host, without depending on the information processing actually executed by this information processing apparatus.

Furthermore, while the foregoing embodiment has handled the exemplary case where the peripheral device is a communication apparatus such as a facsimile machine or MFP, it is to be understood that any peripheral devices such as a printer or scanner can also be used.

Software for implementing the method and program of the present invention may be stored not only in the ROM (RAM) but also in other types of storage media such as a floppy (trademark) disk, CD-ROM, hard disk, memory card, and magneto-optic disk, or alternatively may be downloaded on these media via a network and updated as necessary.

This application claims priority from Japanese Patent Application No. 2004-219554 filed on Jul. 28, 2004, which is hereby incorporated by reference herein.

What is claimed is:

1. A method of controlling an information processing apparatus connectable with peripheral devices via a local interface or a network interface, wherein communication over the local interface proceeds in accordance with a local communication protocol, and wherein communication over the network interface proceeds in accordance with a predetermined network communication protocol, the method comprising the steps of:

using a local interface driver to generate a network communication channel such that resources of a peripheral device connected to the local interface can be seen, from application software for accessing resources of a peripheral device connected via the network interface by use of the predetermined network communication protocol, as network communication resources accessible using the predetermined network communication protocol, wherein the local interface driver allows communication with the peripheral device connected to the local interface to be performed in accordance with the local communication protocol which is different from the network communication protocol, and in a case where information received from the peripheral device via the local interface lacks information that characterizes IP packets, in accordance with the local communication protocol with the peripheral device connected to the local interface, the local interface driver generates the missing information to provide a style of IP packets receivable by the application software; and selecting one of the local interface driver and a network interface driver depending on which of the peripheral device connected via the local interface and the peripheral device connected via the network interface is used to communicate, whereby communication is made with the intended peripheral device.

2. The method of controlling an information processing apparatus according to claim 1, wherein a determination is made as to whether a peripheral device is connected via the local interface, and when the peripheral device is connected via the local interface, the network communication channel is generated by a the local interface driver.

3. An information processing apparatus executing the method of controlling an information processing apparatus according to claim 1 or 2.

4. A computer-readable storage medium storing a program, in executable form, for executing a method of controlling an information processing apparatus, wherein communication over the local interface proceeds in accordance with a local communication protocol, and wherein communication over the network interface proceeds in accordance with a predetermined network communication protocol, the method comprising the steps of:

using a local interface driver to generate a network communication channel such that resources of a peripheral device connected to the local interface can be seen, from application software for accessing resources of a peripheral device connected via the network interface by use of the predetermined network communication protocol, as network communication resources accessible using the predetermined network communication protocol, wherein the local interface driver allows communication with the peripheral device connected to the local interface to be performed in accordance with the local communication protocol which is different from the network communication protocol, and in a case where information received from the peripheral device via the local interface lacks information that characterizes IP packets, in accordance with the local communication protocol with the peripheral device connected to the local interface, the local interface driver generates the missing information to provide a style of IP packets receivable by the application software; and selecting one of the local interface driver and a network interface driver depending on which of the peripheral device connected via the local interface and the peripheral device connected via the network interface is used to communicate, whereby communication is made with the intended peripheral device.

5. The medium according to claim 4, wherein, in said method, a determination is made as to whether a peripheral device is connected via the local interface, and when the peripheral device is connected via the local interface, the network communication channel is generated by the local interface driver.

* * * * *